(12) United States Patent
Rippelmeyer

(10) Patent No.: US 10,400,829 B2
(45) Date of Patent: Sep. 3, 2019

(54) METHOD AND MECHANISM FOR OPEN CLUTCH DRAG REDUCTION

(71) Applicant: Toyota Motor Engineering & Manufacturing North America, Inc., Erlanger, KY (US)

(72) Inventor: Luke A. Rippelmeyer, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 285 days.

(21) Appl. No.: 15/338,682

(22) Filed: Oct. 31, 2016

(65) Prior Publication Data
US 2018/0119753 A1    May 3, 2018

(51) Int. Cl.
| | | |
|---|---|---|
| F16D 13/64 | (2006.01) | |
| F16D 13/68 | (2006.01) | |
| F16D 13/69 | (2006.01) | |
| F16D 25/0638 | (2006.01) | |

(52) U.S. Cl.
CPC ......... *F16D 13/648* (2013.01); *F16D 13/683* (2013.01); *F16D 13/69* (2013.01); *F16D 25/0638* (2013.01)

(58) Field of Classification Search
CPC ...... F16D 13/648; F16D 13/683; F16D 13/69; F16D 25/0638
See application file for complete search history.

(56) References Cited

U.S. PATENT DOCUMENTS

| | | | | |
|---|---|---|---|---|
| 5,598,910 A | * | 2/1997 | Moroto | F16D 21/08 192/48.2 |
| 5,664,655 A | * | 9/1997 | Oh | F16D 3/06 192/70.2 |
| 2005/0040000 A1 | * | 2/2005 | Kelley, Jr. | F16D 23/04 192/35 |

FOREIGN PATENT DOCUMENTS

| | | | | |
|---|---|---|---|---|
| DE | 102009027016 A1 | * | 12/2010 | ........... F16D 13/648 |
| JP | 2766612 B2 | * | 6/1998 | ............ F16D 13/52 |
| JP | 20150151270 A | | 7/2010 | |
| JP | 2015010677 A | | 1/2015 | |

OTHER PUBLICATIONS

Machine translation of DE102009027016, obtained from espacenet.com on Dec. 5, 2018 (Year: 2018).*
Machine translation of JP2766612, obtained from espacenet.com on Dec. 5, 2018 (Year: 2018).*

* cited by examiner

*Primary Examiner* — Stacey A Fluhart
(74) *Attorney, Agent, or Firm* — Christopher G. Darrow; Darrow Mustafa PC

(57) ABSTRACT

A clutch assembly includes at least a first separator plate and a second separator plate coaxial with and adjacent the first separator plate. The first separator plate includes at least a first magnet arranged such that a first pole of the first magnet faces in a direction toward the second separator plate. The second separator plate includes at least a second magnet arranged such that a first pole of the second magnet having a polarity the same as the first pole of the first magnet faces in a direction toward the first separator plate. The first and second magnets are arranged with respect to each other such that a repulsive force tending to force the first and second separator plates away from each other is generated between like poles of the first magnet and the second magnet.

8 Claims, 14 Drawing Sheets

METHOD AND MECHANISM FOR OPEN CLUTCH DRAG REDUCTION

TECHNICAL FIELD

The present invention relates to clutch assemblies and, more particularly, to methods and mechanisms for controlling drag in open clutches.

BACKGROUND

A known conventional clutch assembly may incorporate multiple friction plates and a separator plate positioned between each pair of adjacent friction plates. When the friction and separator plates are in contact with each other or "engaged", a power path is established for torque transmittal to a load (for example, the wheels of a vehicle). When the clutch is disengaged or open, it is desirable to ensure that the separator plates detach from (and remain spaced apart from) the friction plates, in order to minimize clutch drag. Clutch drag may occur in an open clutch when one or more separator plates fail to disengage from associated friction plates, or when the gap between adjacent plates is small, causing drag within the fluid layer separating the adjacent plates. Power losses through open clutch drag may be a significant source of mechanical inefficiency in automotive transmissions.

SUMMARY

In one aspect of the embodiments described herein, a clutch assembly is provided. The clutch assembly includes at least a first separator plate and a second separator plate coaxial with and adjacent the first separator plate. The first separator plate includes at least a first magnet arranged such that a first pole of the first magnet faces in a direction toward the second separator plate. The second separator plate includes at least a second magnet arranged such that a first pole of the second magnet having a polarity the same as the first pole of the first magnet faces in a direction toward the first separator plate. The first and second magnets are arranged with respect to each other such that a repulsive force tending to force the first and second separator plates away from each other is generated between like poles of the first magnet and the second magnet.

In another aspect of the embodiments described herein, a clutch separator plate is provided. The separator plate includes at least one magnet arranged such that a first pole of the at least one magnet faces in a direction away from a first face of the separator plate, and a second pole of the at least one magnet faces in a direction away from a second face of the separator plate opposite the first face.

In another aspect of the embodiments described herein, a method of generating a separation force between adjacent separator plates of a clutch is provided. The method includes steps of providing a first separator plate including at least a first magnet, and providing a second separator plate positioned adjacent the first separator plate and including at least a second magnet, the at least a first magnet being arranged such that a first pole of the at least a first magnet faces in a direction toward the second separator plate, the at least a second magnet being arranged such that a first pole of the at least a second magnet having a polarity the same as the first pole of the at least a first magnet faces in a direction toward the first separator plate, and such that a separation force is generated between like poles of the at least a first magnet and the at least a second magnet.

DETAILED DESCRIPTION

Embodiments described herein relate to a clutch assembly and separator plates for a clutch assembly. Each of the separator plate embodiments incorporates one or more magnets therein. A pole of a first magnet in a first separator plate is positioned opposite and facing a like pole of a second magnet in a second separator plate adjacent the first separator plate. This arrangement produces a repulsive separation force between the adjacent separator plates. This separation force pushes the adjacent separator plates apart when the clutch assembly is in an open condition, thereby helping to ensure that the separator plates are disengaged from the clutch friction plates when the clutch is open.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
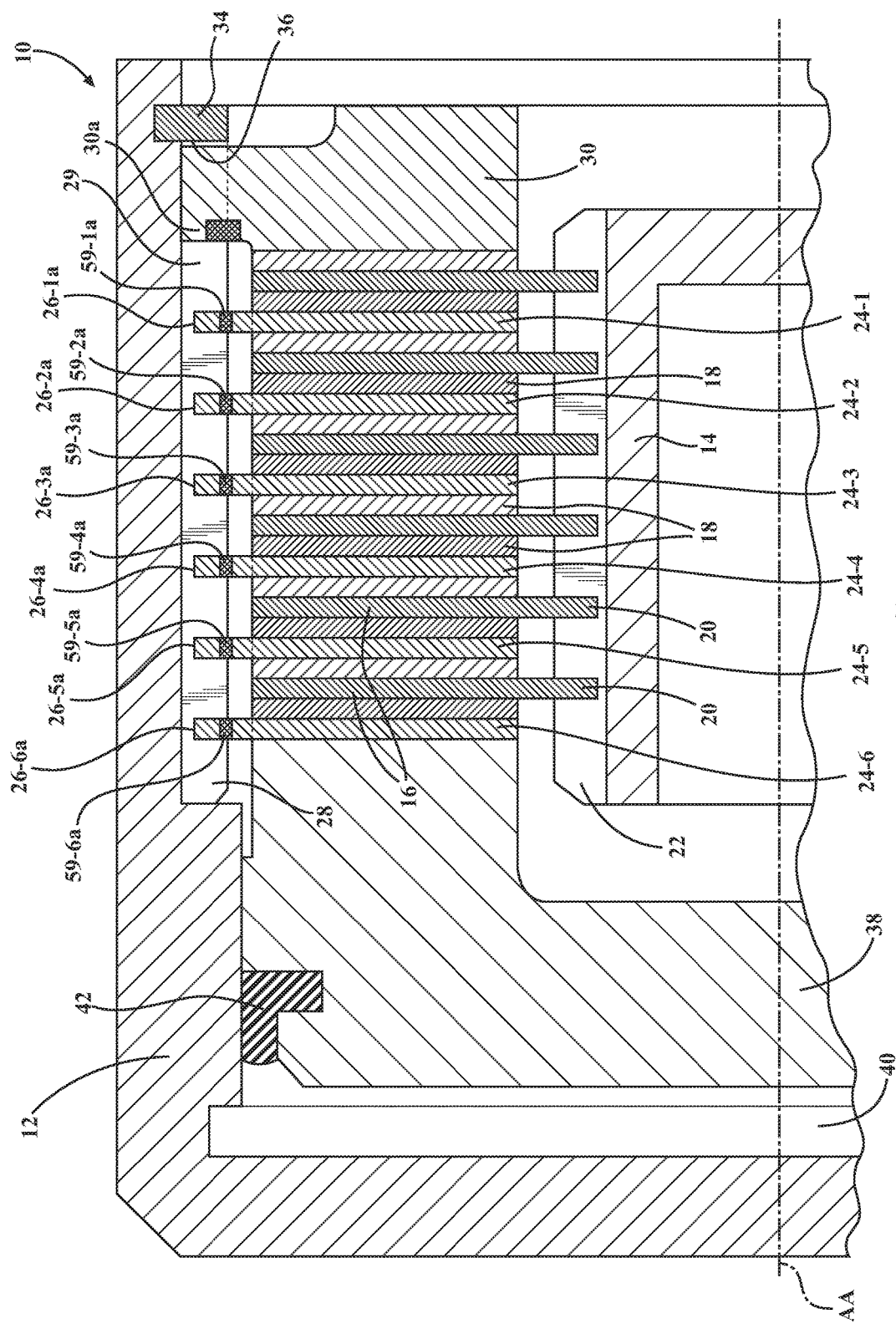
FIG. 1 is a side cross-sectional view of a portion of a clutch assembly in accordance with an embodiment described herein, in an engaged condition.

FIG. 1 shows a side cross-sectional view of a portion of a clutch assembly 10 incorporating multiple friction plates 16 and separator plates 24-1 through 24-6 positioned between each pair of adjacent friction plates, in accordance with an embodiment described herein. FIG. 1 discloses a portion of the upper half of the clutch assembly 10, which is usable in a clutch or brake for an automatic transmission of an automotive vehicle. The clutch assembly may include a rotating member 12 (for example, in the form of a metal drum formed of cast iron, steel, powdered metal or another suitable material and mounted for rotation on suitable bearings (not shown)). An internal metal hub or shaft 14 may also be also formed of one of the above materials and is suitably mounted for rotation. The drum 12 may be adapted to be driven by a torque application member (not shown) and the hub or shaft 14 may be adapted to be drivingly connected to a load (not shown) to be driven, although the driving and driven portions could be reversed.

Figure 2:
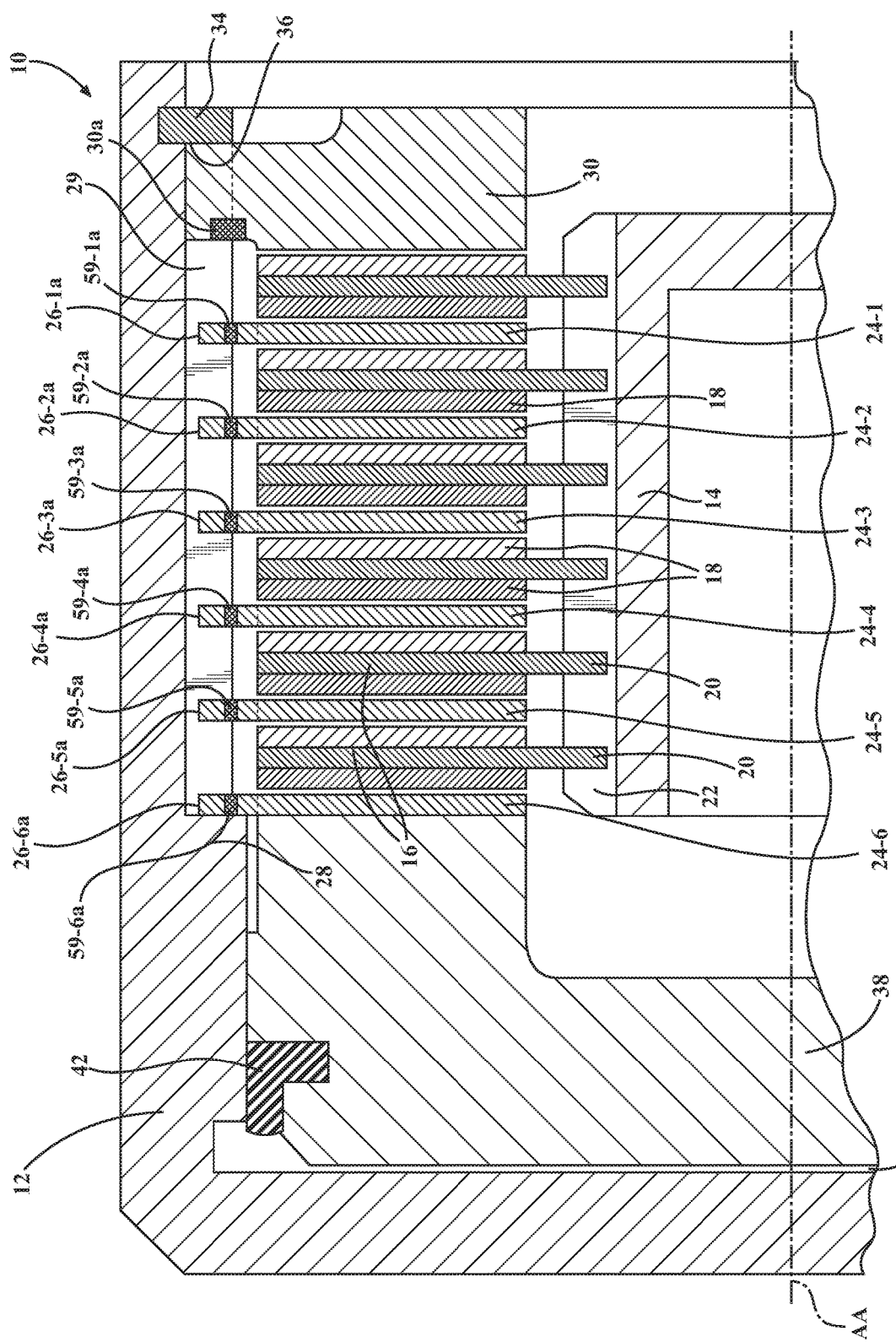
FIG. 2 is the side cross-sectional view of portion of FIG. 1, showing the clutch assembly in an open or disengaged condition.
Figure 2A:
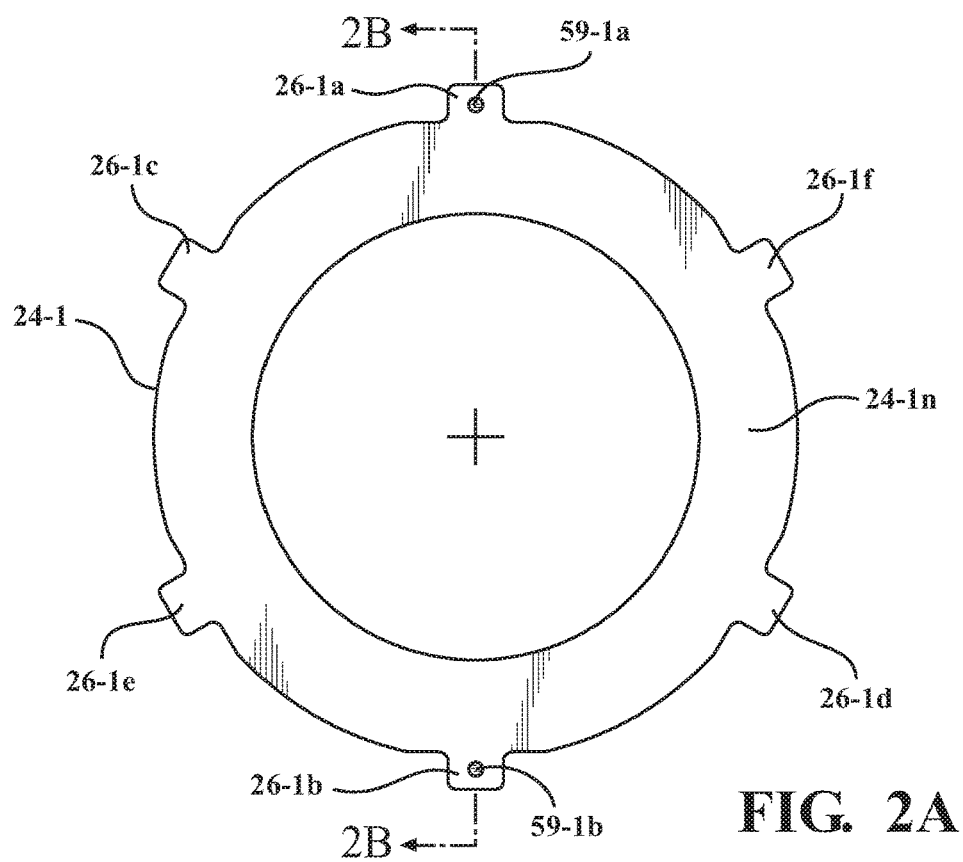
FIG. 2A shows a schematic end view of an individual separator plate incorporating an arrangement of magnets in accordance with an embodiment described herein.
Figure 2B:
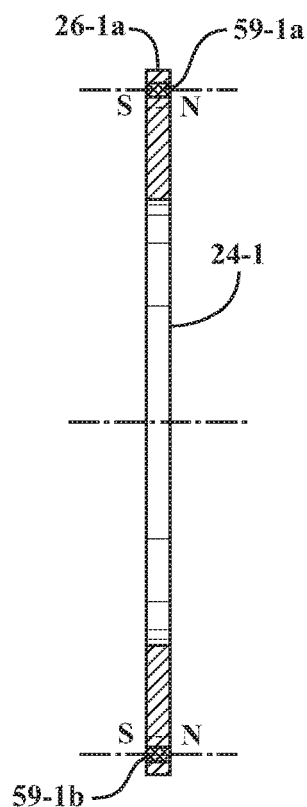
FIG. 2B shows a schematic cross-sectional side view of the separator plate of FIG. 2A.

Between the drum 12 and hub 14 is located a clutch pack formed from a plurality of annular metal plates comprising alternating clutch plates or friction plates 16, and separator plates 24. FIGS. 1 and 2 show separator plates 24-1 through 24-6. The friction plates 16 may have friction linings 18 on oppositely-facing surfaces thereof and internal teeth 20 which mesh with external splines or ribs 22 on the exterior surface of the hub 14. FIG. 2A shows a schematic end view of an exemplary individual separator plate 24-1, as may be incorporated into the embodiment of FIGS. 1 and 2. FIG. 2B shows a cross-sectional side view of the separator plate of FIG. 2A. Each separator plate 24 may have an associated annular portion 24-1n (as shown in FIGS. 2A and 2B, for example) structured for contacting at least one adjacent friction plate of the clutch assembly 10, and a plurality of angularly spaced-apart teeth or tabs 26 extending from an outer edge of the annular portion. Tabs 26 are structured to mesh with the internal splines or ribs 28 on the interior surface of the drum 12, and to move along associated grooves (such as groove 29) defined between the ribs 28. As seen in FIGS. 2A and 2B, separator plates 26 may have tabs 26-1a through 26-1f. The clutch pack embodiment of FIGS. 1-2 shows tabs 26-1a through 26-6a of associated separator plates 26-1 through 26-6. However, the separator plates incorporated into a clutch pack may have any desired number of tabs, depending on the requirements of a particular clutch design. Although shown as operatively connected to a rotating member 12, the separator plates 24 could be connected to a suitable stationary member as where the coupling is applied to a brake rather than a clutch in the transmission. An annular backing plate 30 has teeth 32 on its periphery meshing with the drum splines 28 and is retained axially through a retaining ring 34 mounted in an internal annular groove 36 in the drum.

An annular piston 38 is mounted to slide axially within the drum 12. Fluid under pressure is admitted into a chamber 40 at the left-hand end of the piston 38 (from the perspective of FIG. 1) to urge the piston 38 towards the friction plates 16 to force the friction plates 16 having opposed friction facings 18 and the separator plates 24 into contact with each other between the piston 38 and the backing plate 30 (as shown in FIG. 1). With the friction and separator plates 16, 24 engaged, a power path is established for torque transmittal between drum 12 and the hub 14. An annular seal 42 may be positioned in an external groove in the periphery of the piston to prevent piston fluid leakage from the apply chamber 40 past the piston 38.

FIG. 1 shows the clutch assembly 10 with the friction plates 16 and separator plates 24 engaged by application of pressure by piston 38. Piston 38 may be normally urged leftward (from the perspective of FIGS. 1 and 2) to a disengaged or open position as shown in FIG. 2, by clutch release springs or other suitable release means (not shown). When the fluid in the chamber 40 is allowed to exhaust or exit, the release means may move the piston 38 to the left to its disengaged position to disengage the clutch. FIG. 2 shows the clutch assembly 10 of FIG. 1 in an open state of the clutch, after piston pressure has been removed.

When piston pressure on the clutch pack is removed, it is desirable to ensure that the separator plates 24 detach from (and remain spaced apart from) the friction plates 16, in order to minimize clutch drag when the clutch is open. In embodiments described herein, small magnets are incorporated into the clutch separator plates. The magnets on adjacent separator plates are arranged with like poles facing each other, causing repulsive forces to be generated between the like magnetic poles and the associated separator plates to which the magnets are attached. These repulsive forces can be accurately controlled and varied over a relatively wide range, according to the requirements of a particular application.

Figure 3:
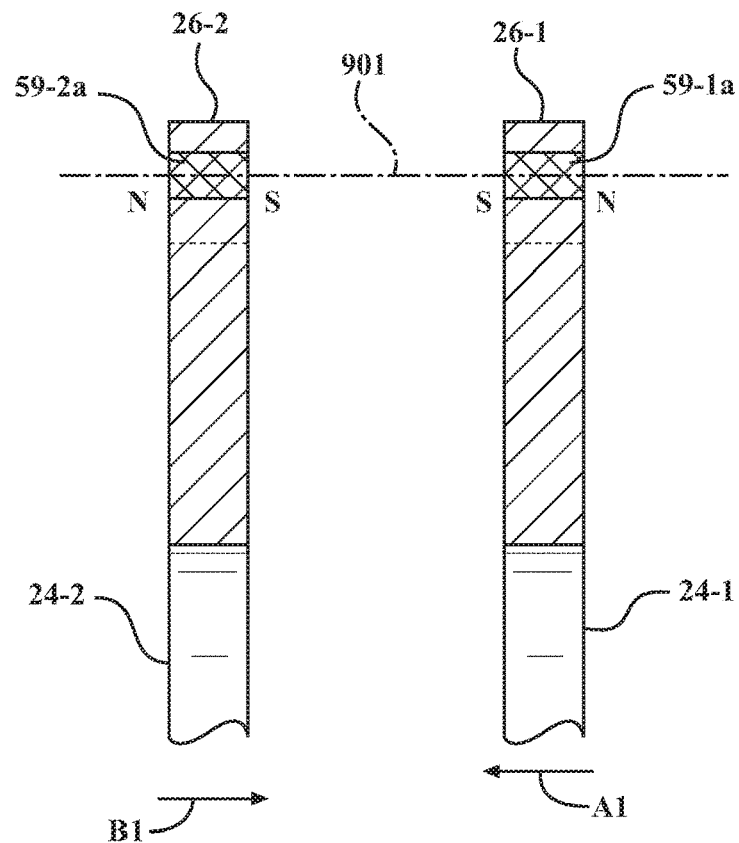
FIG. 3 is a schematic cross-sectional side view of portions of a pair of adjacent separator plates in accordance with an embodiment described herein.
Figure 4:
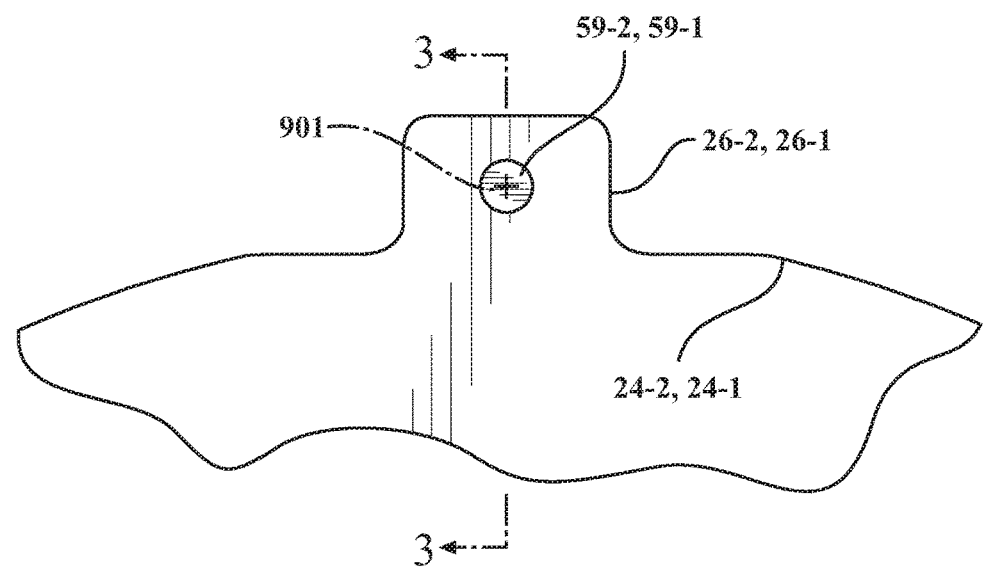
FIG. 4 is a schematic end view of the portions of the separator plates shown in FIG. 3.

FIG. 3 is a schematic cross-sectional side view of an embodiment of a pair of separator plates 24-1 and 24-2 as shown in FIGS. 1 and 2. FIG. 4 is a schematic end view of the pair of separator plates shown in FIG. 3. In the embodiment shown in FIGS. 1-2 and 3-4, clutch assembly 10 includes at least a first separator plate 24-1 and a second separator plate 24-2 in a coaxial relationship with and adjacent the first separator plate 24-1. The first separator plate 24-1 includes a first magnet 59-1a arranged such that a first pole (a South pole in the example shown) of the first magnet 59-1a faces in a direction "A1" toward the second separator plate 24-2. In addition, the second separator plate 24-2 includes a second magnet 59-2a arranged such that a first pole of the second magnet 59-2a, which has a polarity (a South pole in the example shown) the same as the first pole of the first magnet 59-1a, and which faces in a direction "B" toward the first separator plate 24-1.

The first and second magnets 59-1a and 59-2a are arranged such that a repulsive force tending to force the first and second separator plates 24-1 and 24-2 away from each other is generated between like poles of the first magnet 59-1a and the second magnet 59-2a. Thus, the first and second magnets 59-1a and 59-2a are positioned in the adjacent separator plates so that their like poles will interact to generate a repulsive force between the magnets when the friction plates 16 and separator plates 24 are forced into contact by piston pressure. This helps ensure that the separator plates 24 will tend to move away from each other and remain spaced apart when the piston pressure is removed. In the embodiment shown in FIGS. 3 and 4, magnets 59-1a and 59-2a are arranged coaxially along an axis 901.

As applied to separator plates of the clutch assembly embodiments described herein, a first separator plate is deemed to be "adjacent" another separator plate when the first separator plate is the separator plate closest to the other separator plate in any direction. Thus, for example, in the embodiment shown in FIGS. 1 and 2, separator plates 24-1 and 24-2 are adjacent separator plates, and both of separator plates 24-4 and 24-6 are adjacent separator plate 24-5.

Figure 5A:
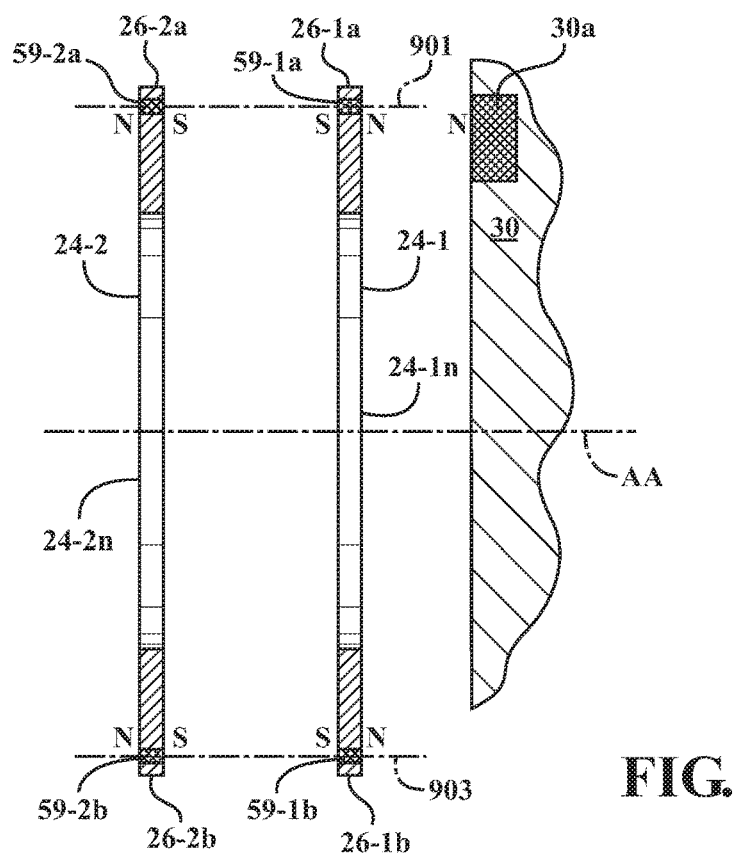
FIG. 5A is a schematic cross-sectional side view of a pair of adjacent separator plates shown positioned in relation to a backing plate magnet, in accordance with an embodiment described herein.
Figure 5B:
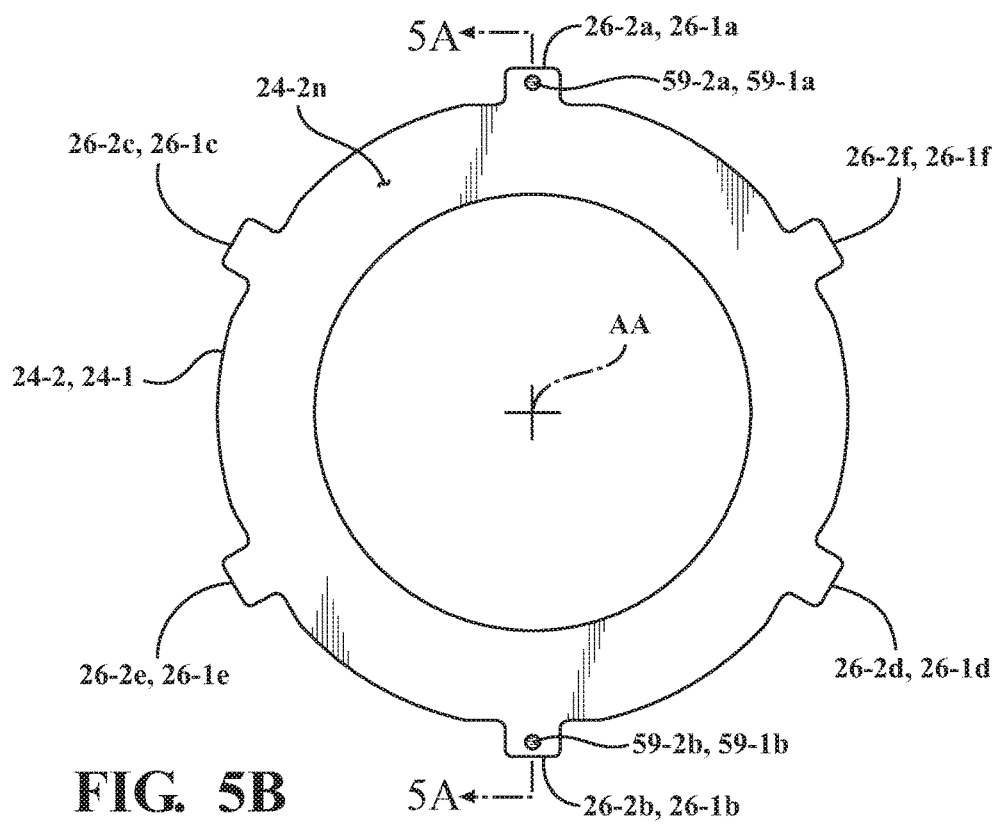
FIG. 5B is a schematic end view of the separator plates shown in FIG. 5A.

In clutch assembly embodiments described herein, each pair of adjacent separator plates (such as first and second separator plates 24-1 and 24-2 described above) may incorporate one or more pairs of magnets arranged as previously described, with each pair of magnets arranged so that a repulsive force tending to force the first and second separator plates 24-1 and 24-2 away from each other is generated by interaction between like poles of the magnets of each pair of magnets. For example, FIG. 5A is a schematic cross-sectional side view of the adjacent separator plates 24-1 and 24-2 shown in FIGS. 1-2 and 3-4. FIG. 5B is a schematic end view of the coaxially-aligned separator plates 24-1 and 24-2 shown in FIG. 5A. First separator plate 24-1 has an annular portion 24-1n and a plurality of angularly spaced-apart tabs 26-1a through 26-1f extending equi-angularly from an outer edge of the annular portion 24-1n. Also, the second separator plate 24-2 has an annular portion 24-2n and a plurality of angularly spaced-apart tabs 26-2a through 26-2f equi-angularly distributed along an outer edge of the separator plate in a manner similar to separator plate 24-1. In the embodiment shown, each of tabs 26-2a through 26-2f of separator plate 24-2 is aligned with an associated one of tabs 26-1a through 26-1f of separator plate 24-1.

In the embodiment shown, the magnets 59-1a and 59-2a are positioned in associated adjacent and aligned tabs 26-1a and 26-2a of the separator plates 24-1 and 24-2. More specifically, the first separator plate 24-1 has a first tab 26-1a and the second separator plate 24-2 has a second tab 26-2a aligned with and adjacent the first tab 26-1a. A first magnet 59-1a is arranged in the first tab 26-1a such that a first pole of the first magnet 59-1a faces in a direction toward the second tab 26-2a. In addition, the second magnet 59-2a is arranged in the second tab 26-2a such that the first pole of the second magnet 59-2a having a polarity the same as the first pole of the first magnet 59-1a faces in a direction toward the first tab 26-1a, such that a repulsive force tending to force the first and second tabs 26-1a and 26-2a away from each other is generated between like poles of the first magnet 59-1a and the second magnet 59-2a. For example, the magnets may be positioned and secured in through holes provided in the separator plates, using adhesives, interference fits, or any other suitable method. In addition, the magnets of any pair of magnets described herein may be positioned at locations other than in the tabs of the separator plates, if desired.

In addition, referring again to FIGS. 5A-5B, another pair of magnets 59-1b and 59-2b may also be arranged in associated ones of separator plates 24-1 and 24-2 as previously described, to generate repulsive forces tending to urge the plates 24-1 and 24-2 away from each other. In the embodiment shown, the magnets 59-1b and 59-2b are positioned in associated adjacent and aligned tabs 26-1b and 26-2b of the separator plates 24-1 and 24-2. In addition, the tab 26-1b may be located diametrically opposite the tab 26-1a, and the tab 26-2b may be located diametrically opposite the tab 26-2a. This arrangement aids in generating repulsive forces on each separator plate on each side of the clutch rotational axis AA and at equal distances from the axis, to aid in balancing the repulsive forces applied to the separator plates 24-1 and 24-2. In the embodiment shown in FIGS. 5A and 5B, the magnets of the pair of magnets 59-1a and 59-2a are coaxial along an axis 901 extending parallel to a rotational axis AA of the clutch assembly. Also, the magnets of the pair of magnets 59-1b and 59-2b are coaxial along an axis 903 extending parallel to the rotational axis AA of the clutch assembly. Alternatively, the axes of the magnets of any pair magnets may be offset from each other in a manner described herein. In embodiments described herein, the clutch rotational axis AA may be coaxial with the axes of the separator plates when the separator plates are part of the clutch assembly, as shown in FIGS. 1 and 2.

First and second magnets positioned in associated first and second adjacent separator plates may be considered to be coaxial if a centroidal axis passing through an end face of the first magnet closest to the second separator plate coincides (within a certain design tolerance limit) with a centroidal axis passing through an end face of the second magnet closest to the first separator plate (within applicable positional tolerance limits). In certain embodiments, the centroidal axes of the magnets described herein extend generally parallel with a rotational axis AA of the clutch assembly 10. Thus, the magnetic poles of a magnet may lie along the centroidal axis of the magnet. For example, in the embodiment shown in FIGS. 1-2, 3-4, and 5A-5B, magnets 59-1a and 59-2a are considered to be coaxial along the axis 901 extending parallel to a rotational axis AA of the clutch assembly 10. In certain embodiments, magnets incorporated into the separator plate embodiments described herein are cylindrical and have circular or rectangular cross-sectional shapes. However, other shapes may be used.

A first tab on a first separator plate is deemed to be "adjacent" a second tab on a second, adjacent separator plate when the second tab is a tab that is aligned with the first tab and closest to the first tab in any direction. Thus, in the embodiment shown in FIGS. 5A-5B, tabs 26-1*a* and 26-2*a* are adjacent tabs, and tabs 26-1*b* and 26-2*b* are also adjacent tabs. In FIGS. 1-2, tabs 26-6*a* and 26-4*a* are both adjacent tab 26-5*a*. Also, a tab is considered to be aligned with another tab when both tabs reside in and move along the same drum groove 29 during operation of the clutch. Thus, in the embodiment shown in FIGS. 1 and 2, all of tabs 26-1*a* through 26-6*a* are considered to be aligned with each other.

In other embodiments described herein, in a pair of magnets interacting as described above, the centroidal or central axis of a first magnet of the pair of magnets may be offset from a centroidal or central axis of the other, second magnet of the pair of magnets (i.e., the magnets may not be coaxial). Thus, the first magnet may be positioned along a first axis extending parallel to a rotational axis AA of the clutch, and the second magnet may be positioned along a second axis extending parallel to a rotational axis of the clutch, with the second axis spaced apart from the first axis. This offsetting of the axes of magnets provides one method controlling the effective spacing between the like magnetic poles, which enables fine tuning or adjustments to the repulsive force. The ability to control the effective spacing between the like magnetic poles may enable a single type or strength of magnet to be used for multiple applications.

Figure 6A:
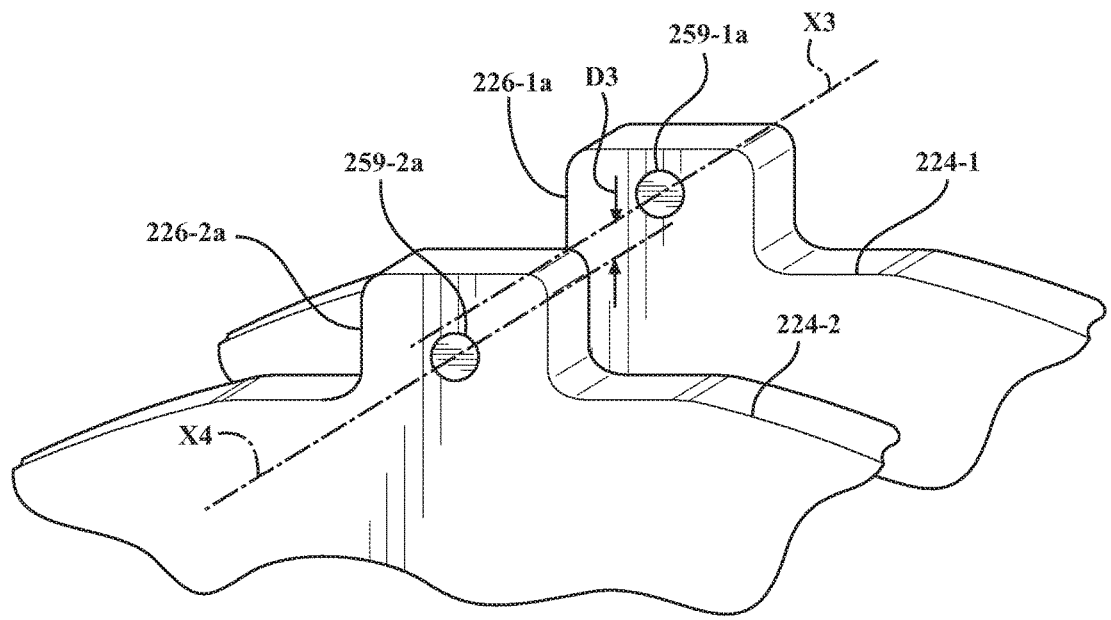
FIG. 6A is a schematic perspective view of aligned tabs in a pair of adjacent separator plates, showing a spatial relationship between adjacent separator plate magnets in accordance with one embodiment described herein.
Figure 6B:
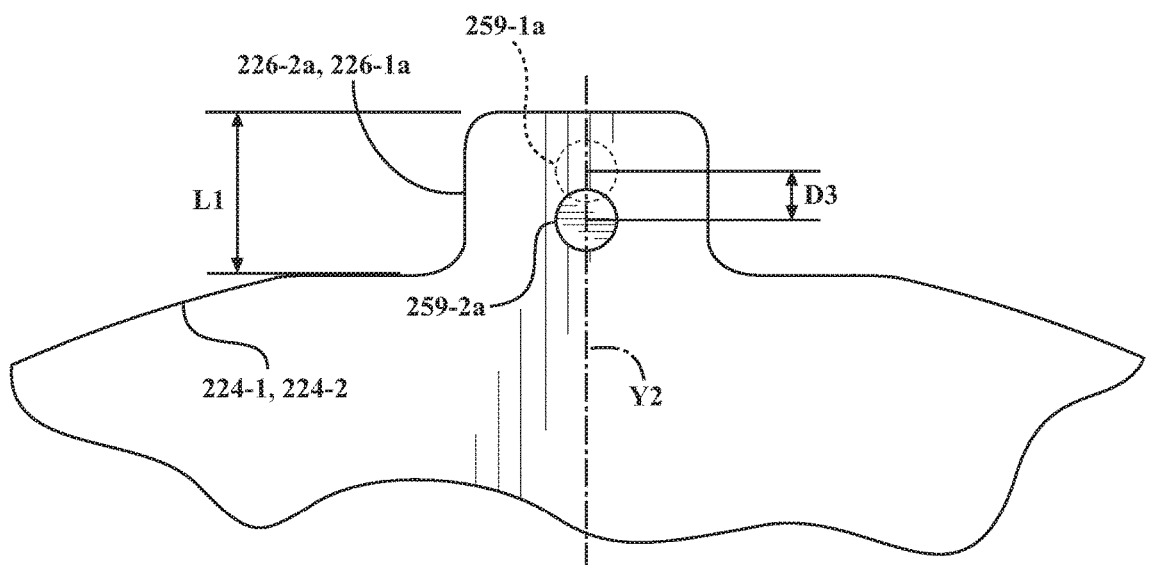
FIG. 6B is a schematic end view of the tabs and magnet arrangement shown in FIG. 6A.

FIGS. 6A-8B show various examples of such an arrangement. In one example, FIG. 6A is a schematic perspective view of adjacent, aligned tabs 226-2*a* and 226-1*a* similar to tabs 26-1*a* and 26-2*a* of FIGS. 1 and 2, and incorporating therein respective magnets 259-2*a* and 259-1*a*. FIG. 6B is a schematic end view of the tabs of FIG. 6A, showing the alignment of the tabs in a groove of the drum (not shown). Magnet 259-1*a* has a central axis X3, and magnet 259-2*a* has a central axis X4. It may be seen that the magnet axes X3 and X4 are offset from each other a distance D3, extending generally along or parallel to a plane extending radially through the rotational axis AA (not shown) of the clutch assembly to bisect the tabs 226-2*a* and 226-1*a*.

Figure 7A:
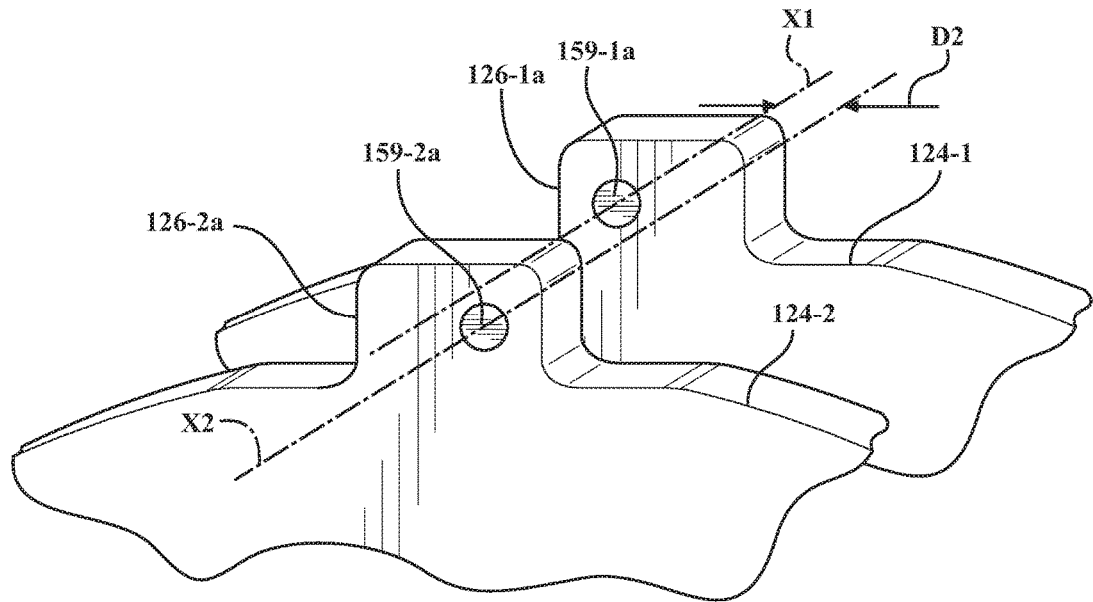
FIG. 7A is a schematic perspective view of aligned tabs in a pair of adjacent separator plates, showing a spatial relationship between adjacent separator plate magnets in accordance with another embodiment described herein.
Figure 7B:
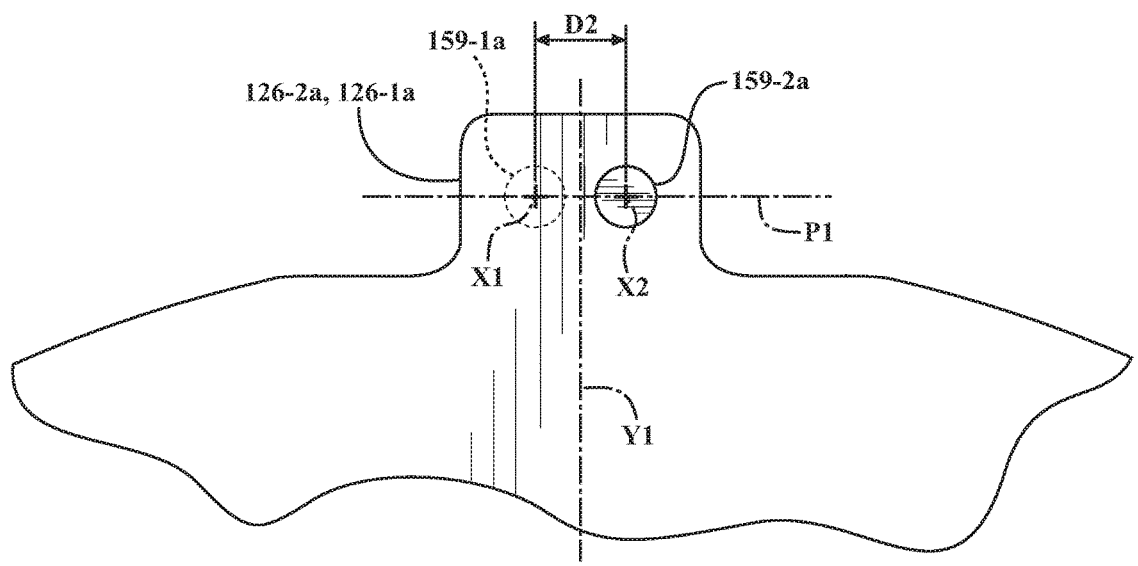
FIG. 7B is a schematic end view of the tabs and magnet arrangement shown in FIG. 7A.

In another example, FIG. 7A is a schematic perspective view of adjacent, aligned tabs 126-2*a* and 126-1*a* similar to tabs 26-1*a* and 26-2*a* of FIGS. 1 and 2, and incorporating therein respective magnets 159-2*a* and 159-1*a*. FIG. 7B is a schematic end view of the tabs of FIG. 7A, showing the alignment of the tabs in a groove of the drum (not shown). Magnet 159-1*a* has a central axis X1, and magnet 159-2*a* has a central axis X2. It may be seen that the magnet axes X1 and X2 are offset from each other a distance D2 extending along a plane P1 which is generally perpendicular to a plane extending radially through the rotational axis AA (not shown) of the clutch assembly to bisect the tabs 126-1*a* and 126-2*a*.

Figure 8A:
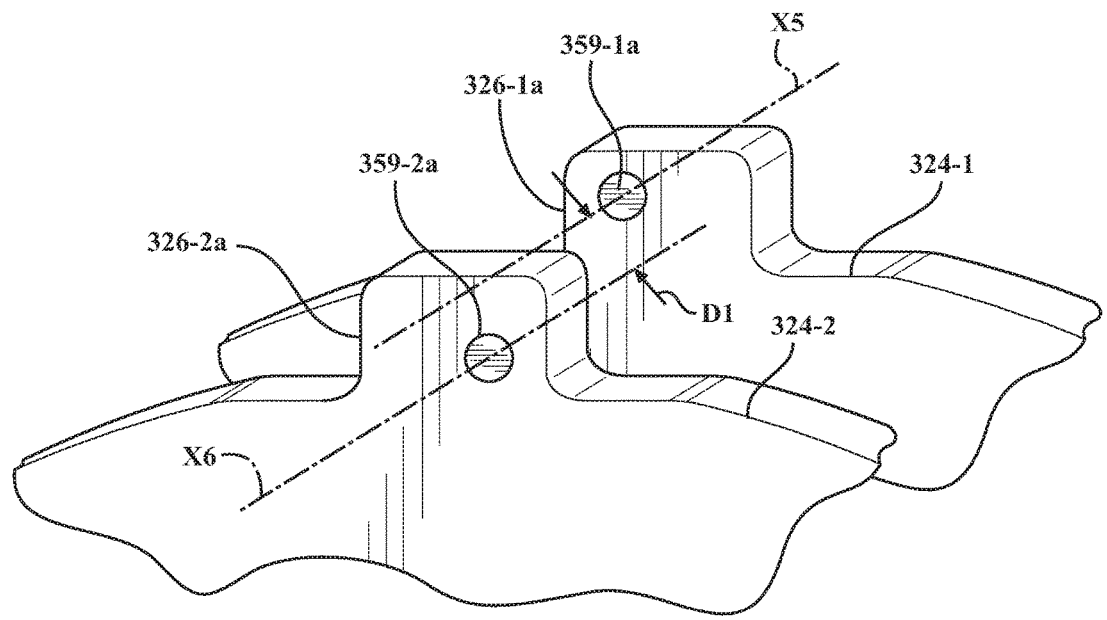
FIG. 8A is a schematic perspective view of aligned tabs in a pair of adjacent separator plates, showing a spatial relationship between adjacent separator plate magnets in accordance with another embodiment described herein.
Figure 8B:
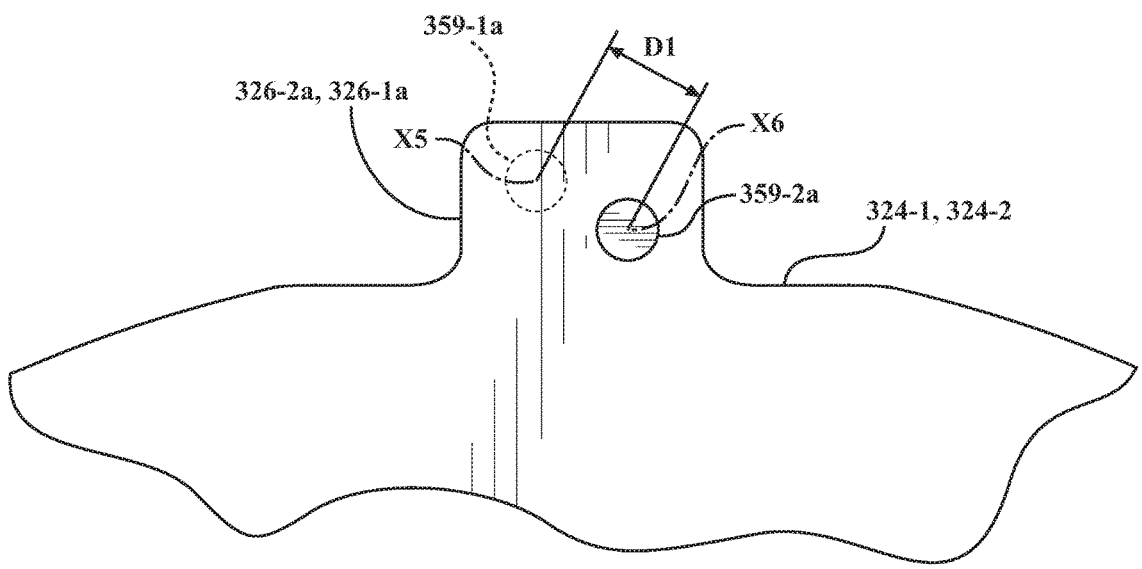
FIG. 8B is a schematic end view of the tabs and magnet arrangement shown in FIG. 8A.

In another example, FIG. 8A is a schematic perspective view of adjacent, aligned tabs 326-2*a* and 326-1*a* similar to tabs 26-1*a* and 26-2*a* of FIGS. 1 and 2, and incorporating therein respective magnets 359-2*a* and 359-1*a*. FIG. 8B is a schematic end view of the tabs of FIG. 8A, showing the alignment of the tabs in a groove of the drum (not shown). Magnet 359-1*a* has a central axis X5, and magnet 359-2*a* has a central axis X6. It may be seen that the magnet axes X5 and X6 are offset from each other a distance D1 as shown, and are offset from each other both radially (in a direction parallel to a radius extending from the clutch rotational axis) and laterally (i.e., orthogonally with respect to a radial direction from the clutch rotational axis).

Figure 9:
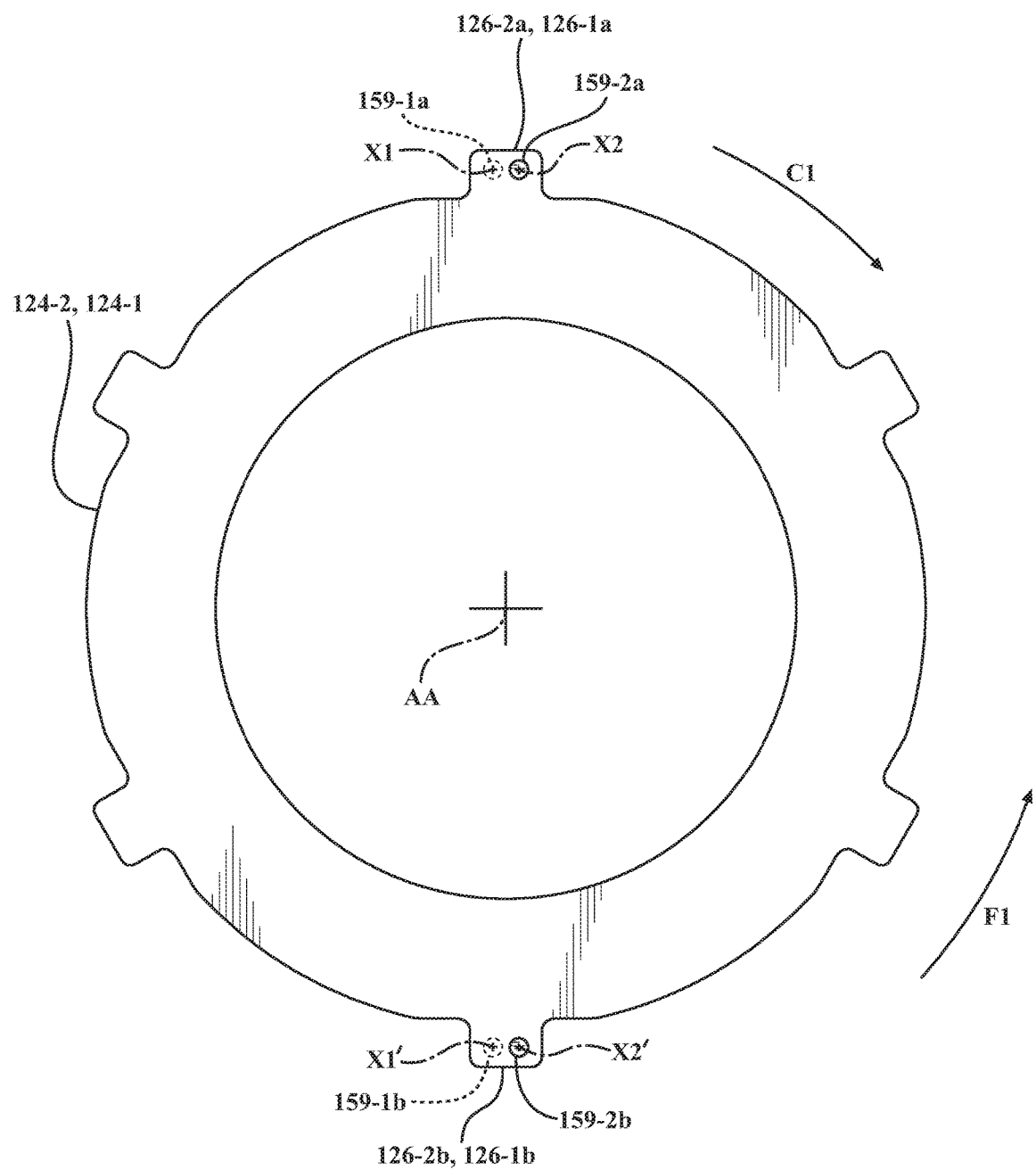
FIG. 9 is a schematic end view of a pair of adjacent separator plates, each plate incorporating a pair of magnets as shown in FIGS. 7A-7B.

Especially in embodiments with offsets such as those shown in FIGS. 7A-7B and 8A-8B having a non-radial component, the repulsive forces between the adjacent magnets may tend to produce a rotation of one of the separator plates with relative to the other plate. In such cases, these rotational forces may be balanced by providing another pair of magnets arranged so as to provide a counter-rotational force. For example, FIG. 9 shows a schematic end view of a pair of separator plates incorporating a first pair of magnets 159-1*a* and 159-2*a* as shown in FIGS. 7A-7B. Repulsive forces generated by magnets 159-1*a* and 159-2*a* will tend to produce a rotation of the separator plate 124-2 with respect to separator plate 124-1 in the direction C1. To offset the rotational component of the repulsive forces generated by the magnets 159-1*a* and 159-2*a*, the first separator plate 124-1 may further include a third magnet 159-1*b* arranged such that a first pole of the third magnet faces in a direction toward the second separator plate 124-2, and the second separator plate 124-2 may further include a fourth magnet 159-2*b* arranged such that a first pole of the fourth magnet 159-2*b* having a polarity the same as the first pole of the third magnet 159-1*b* faces in a direction toward the first separator plate 124-1, and such that a repulsive force tending to force the first and second separator plates 124-1 and 124-2 away from each other is generated between like poles of the third and fourth magnets 159-1*b* and 159-2*b*.

In addition, the third magnet 159-1*b* is positioned along a third axis X1' extending parallel to the rotational axis AA of the clutch assembly 10, and the fourth magnet 159-2*b* may be positioned along a fourth axis X2' extending parallel to the rotational axis AA of the clutch assembly, with the fourth axis X2' spaced apart from the third axis X1'. Also, the fourth axis X2' is located with respect to the third axis X1' such that the repulsive force generated between like poles of the third and fourth magnets 159-1*b* and 159-2*b* tends to produce a rotation of the second separator plate 124-2 in a second direction F1 relative to the first separator plate 124-1, the second direction F1 being opposite the first direction C1.

Any of the arrangements of magnets of a pair of adjacent magnets as described herein may be repeated for other pairs of magnets along a length of a clutch pack, for example as shown in FIGS. 1 and 2.

Separate magnets incorporated into adjacent tabs or opposed portions of adjacent separator plates as described herein may have the same or equal strengths. For example, a first magnet of a pair of adjacent, interacting magnets may have an energy density equal to an energy density of a second magnet of the pair of magnets. Alternatively, magnets incorporated into adjacent tabs or opposed portions of adjacent separator plates as described herein may have different strengths, according to particular design requirements.

Referring again to FIGS. 1 and 5A, in certain embodiments, the clutch assembly may include a backing plate, such as backing plate 30. The first separator plate 24-1 may be located adjacent the backing plate 30, and a first magnet 59-1*a* incorporated into the separator plate 24-1 may have a second pole (in the embodiment shown, a North pole) opposite the first pole of the first magnet facing separator plate 24-2. Also, a backing plate magnet 30*a* may be arranged in the backing plate 30 adjacent the first separator plate 24-1 such that a pole of the backing plate magnet having a polarity the same as the second pole of the first magnet 59-1*a* faces in a direction toward the first separator plate 24-1, and such that a repulsive force tending to force the first separator plate 24-1 away from the backing plate 30 is generated between like poles of the first magnet 59-1*a* and the backing plate magnet 30*a*. This repulsive force will tend to force the first separator plate 24-1 away from the backing plate when the piston pressure is removed from the clutch pack.

FIGS. 10A-13 are schematic cross-sectional side views of portions of various embodiments of individual separator plates. These Figures show alternative ways that the spacing between magnets in adjacent separator plates or tabs may be varied, to correspondingly vary the repulsive forces generated by interaction between the magnets. Although the magnets shown in FIGS. 10A-13 are incorporated into associated tabs of the separator plates, it will be understood that the principles described may be applied to magnets positioned at other locations along the separator plates. The Figures show a schematic side cross-sectional view of an exemplary separator plate 524 which will be used to illustrate a variety of magnet embodiments and positioning schemes.

Figure 10A:
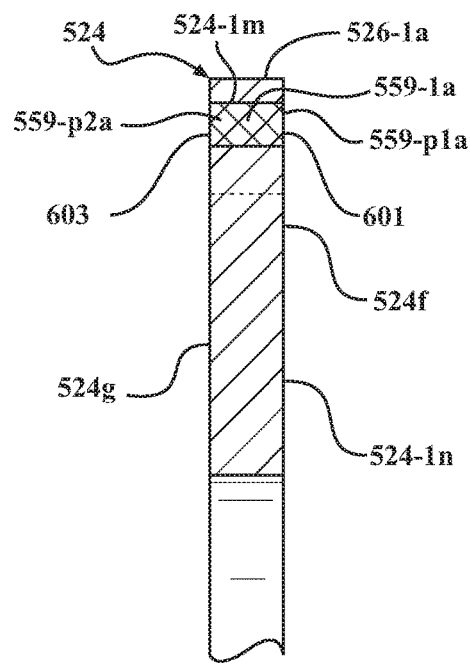
FIG. 10A is a schematic cross-sectional side view of a portion of a separator plate showing a magnet positioned within an opening formed in the plate, in accordance with one embodiment described herein.
Figure 10B:
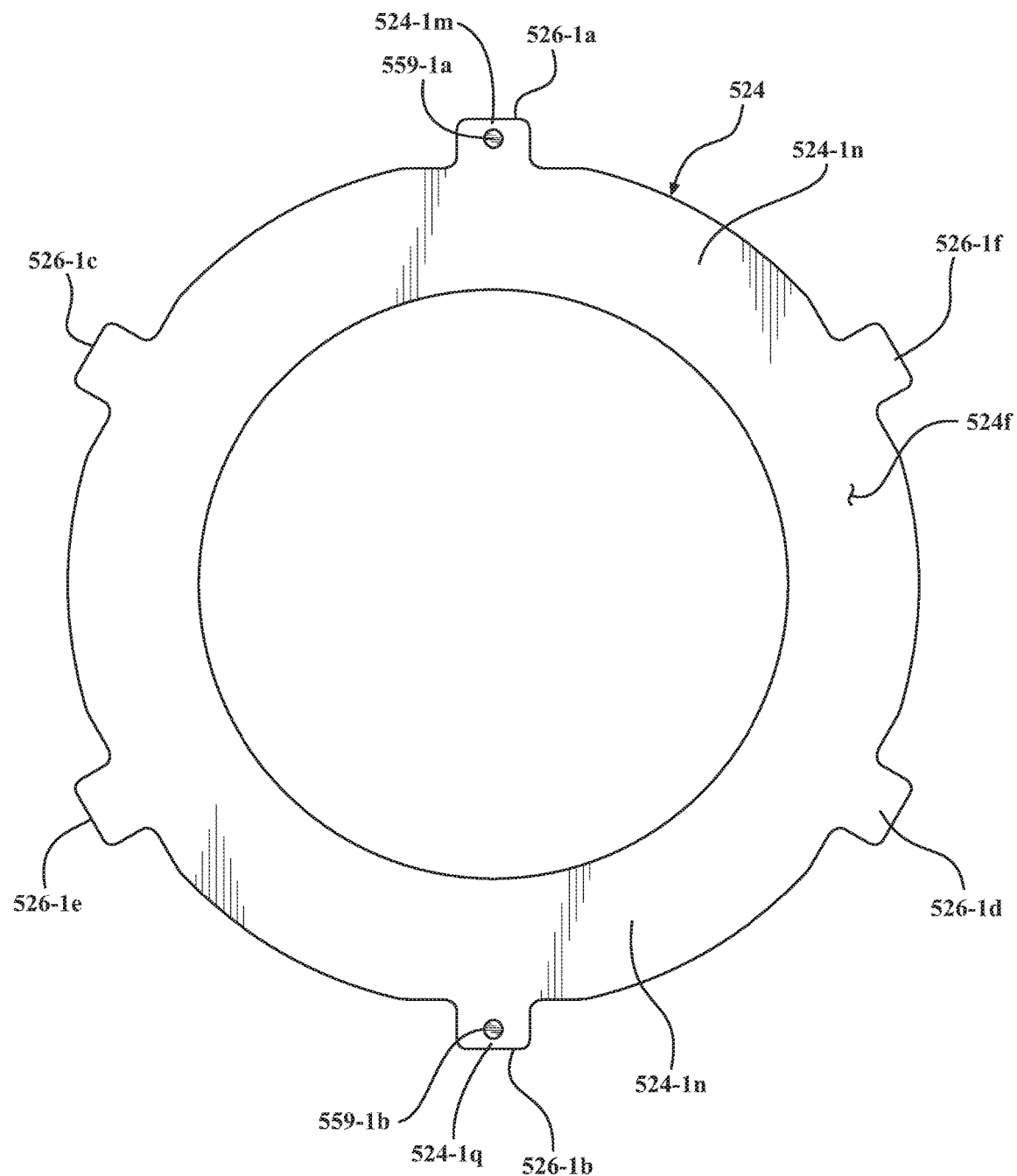
FIG. 10B is a schematic end view of the separator plate shown in FIG. 10A.

Referring to FIGS. 10A-10B, separator plate 524 may have a first planar side or face 524$f$ and a second planar side or face 524$g$ facing in a direction opposite the first face 524$f$. The separator plate 524 may have an annular portion 524-1$n$ and a plurality of tabs 526-1$a$ through 526-1$f$ extending from an outer edge of the annular portion, as previously described. The separator plate annular portion 524-1$n$ and tabs may lie along and comprise portions of the first face 524$f$ and the second face 524$g$. Portions of the first face 524$f$ may be configured for making contact with a friction plate (not shown) adjacent the separator plate 524, along the first face of the separator plate. Portions of the second face 524$g$ may be configured for making contact with another friction plate (not shown) adjacent the separator plate, on the second face 524$g$ of the separator plate 524 opposite the first side 524$f$ of the separator plate 524.

Referring again to FIGS. 10A-10B, and as previously described, the separator plate 524 may include at least one magnet 559-1$a$ arranged such that a first pole 559-$p$1$a$ (either a North pole or a South pole) of the at least one magnet 559-1$a$ faces in a direction away from the first face 524$f$ of the separator plate, and the second, opposite pole 559-$p$2$a$ of the at least one magnet 559-1$a$ faces in a direction away from a second face 524$g$ of the separator plate 524 opposite the first face 524$f$.

A magnet similar to magnet 559-1$a$ may be arranged on each tab of at least a portion of the tabs of the plurality of tabs. In certain embodiments, magnets may be located symmetrically in or on the separator plates of a clutch assembly, so as to balance repulsive forces exerted on the separator plates. For example, in the embodiment shown in FIGS. 10A-10B, the separator plate 524 may include a magnet 559-1$a$ located in an opening 524-1$m$ formed in tab 526-1$a$ and a magnet 559-1$b$ located in an opening 524-1$q$ in tab 526-1$b$ positioned diametrically opposite the tab 526-1$a$. In addition, separator plates adjacent plate 524 may have magnets located on tabs which are adjacent and aligned with tabs 526-1$a$ and 526-1$b$.

Referring to FIG. 10A, in certain embodiments, a magnet may be positioned in an opening 524$m$-1 formed in the separator plate 524 such that at least one of a first end and a second end of the magnet is coplanar with one of the first face 524$f$ and the second face 524$g$ when the magnet is positioned in the separator plate. In the particular embodiment shown in FIG. 10A, both ends of the magnet 559-1$a$ are coplanar with a face of the separator plate (i.e., a first end 601 of the magnet is coplanar with first face 524$f$, and a second end 603 of the magnet is coplanar with second face 524$g$).

Figure 11:
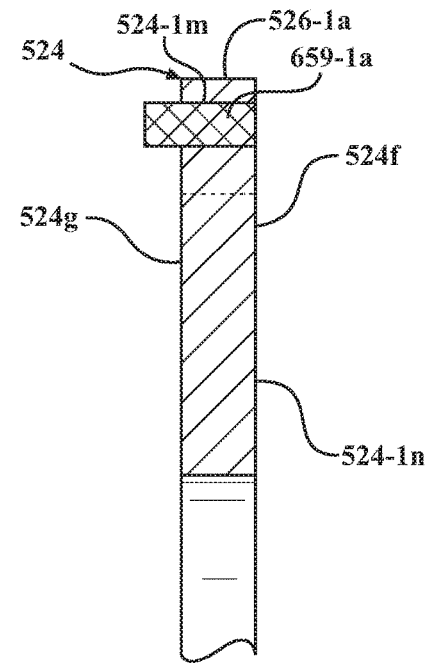
FIG. 11 is a schematic cross-sectional side view of a portion of a separator plate showing a magnet positioned within an opening formed in the plate, in accordance with another embodiment described herein.

Referring to FIG. 11, in particular embodiments, a magnet (such as magnet 659-1$a$) may be positioned in an opening 524-1$m$ formed in the separator plate 524 such that the magnet extends from the opening past at least one of the first face 524$f$ and the second face 524$g$. In the embodiment shown, the magnet 659-1$a$ extends from the opening 524$m$-1 past the second face 524$g$. This may reduce the effective distance between the magnet 659-1$a$ and an adjacent magnet positioned in a separator plate residing opposite and adjacent second face 524$g$, thereby increasing the repulsive force generated by interaction of the adjacent magnets. The ability to control the lengths of the magnets facilitates adaptation of the repulsive forces to different spacing requirements for adjacent separator plates in different clutch designs.

Figure 12:
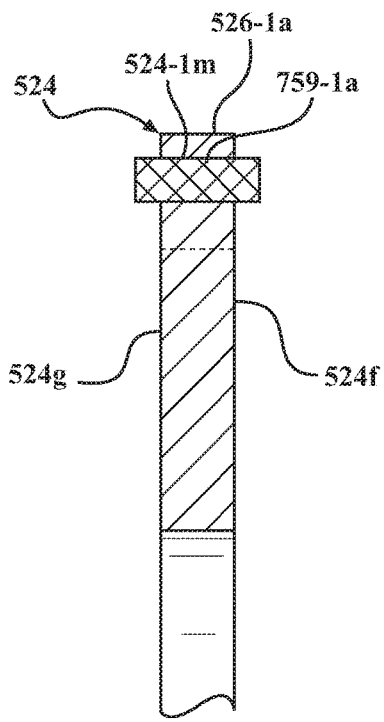
FIG. 12 is a schematic cross-sectional side view of a portion of a separator plate showing a magnet positioned within an opening formed in the plate, in accordance with another embodiment described herein.

Referring to FIG. 12, in particular embodiments, a magnet (such as magnet 759-1$a$) may be positioned in an opening 524$m$-1 formed in the separator plate 524 such that the magnet extends from the opening past both the first face 524$f$ and the second face 524$g$. This may reduce the effective distance between the magnet 759-1$a$ and adjacent magnets positioned in a separator plate residing opposite and adjacent second face 524$g$, and also in a separator plate residing opposite and adjacent second face 524$g$, thereby increasing the repulsive forces generated by interaction with the adjacent magnets.

Figure 13:
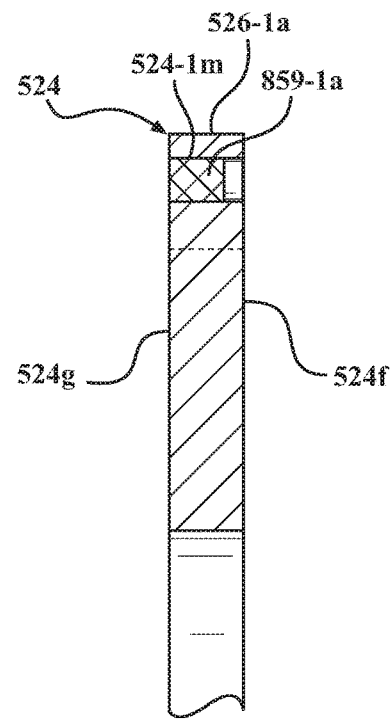
FIG. 13 is a schematic cross-sectional side view of a portion of a separator plate showing a magnet positioned within an opening formed in the plate, in accordance with another embodiment described herein.

Referring to FIG. 13, in particular embodiments, a magnet (such as magnet 859-1$a$) may be positioned in an opening 524$m$-1 formed in the separator plate 524 such that at least one of a first end and a second end of the magnet resides within the opening and is spaced apart from one of the first face 524$f$ and the second face 524$g$. In the embodiment shown in FIG. 13, an end of the magnet resides within the opening 524$m$-1 and is spaced apart from the separator plate first face 524$f$. This may reduce the effective distance between the magnet 859-1$a$ and an adjacent magnet positioned in a separator plate residing opposite and adjacent first face 524$f$, thereby reducing the repulsive forces generated by interaction between magnet 859-1$a$ and the adjacent magnet.

Figure 14A:
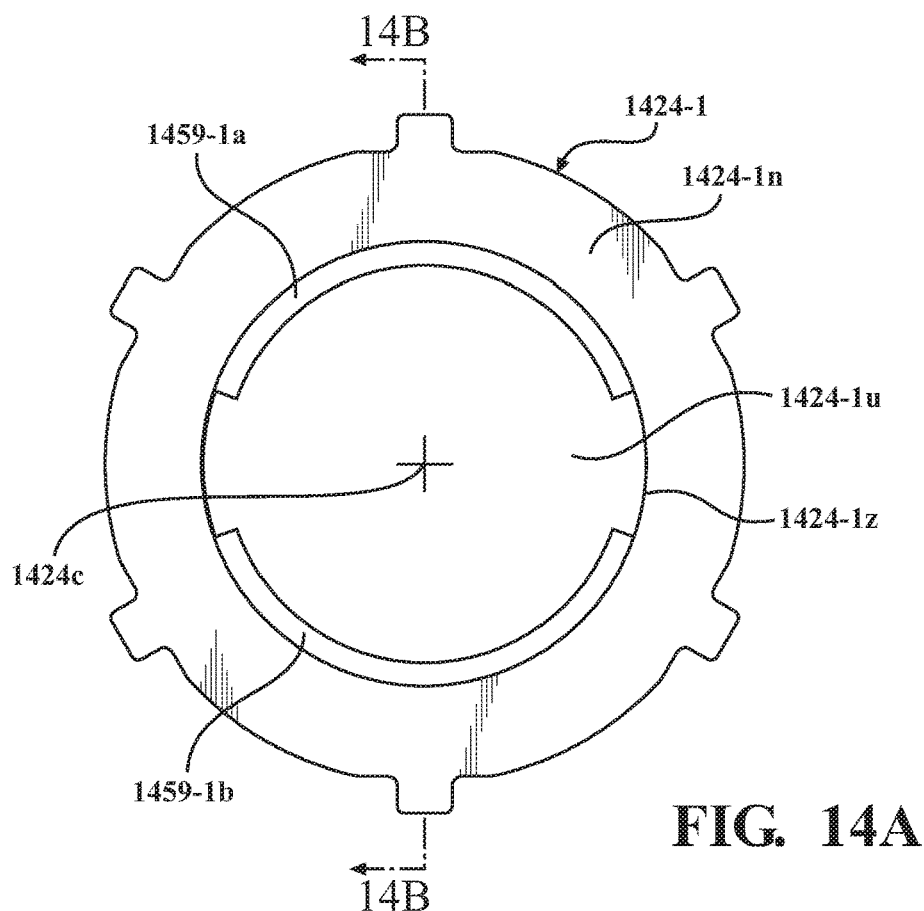
FIG. 14A is a schematic end view of a separator plate incorporating a magnet arrangement in accordance with another embodiment described herein.
Figure 14B:
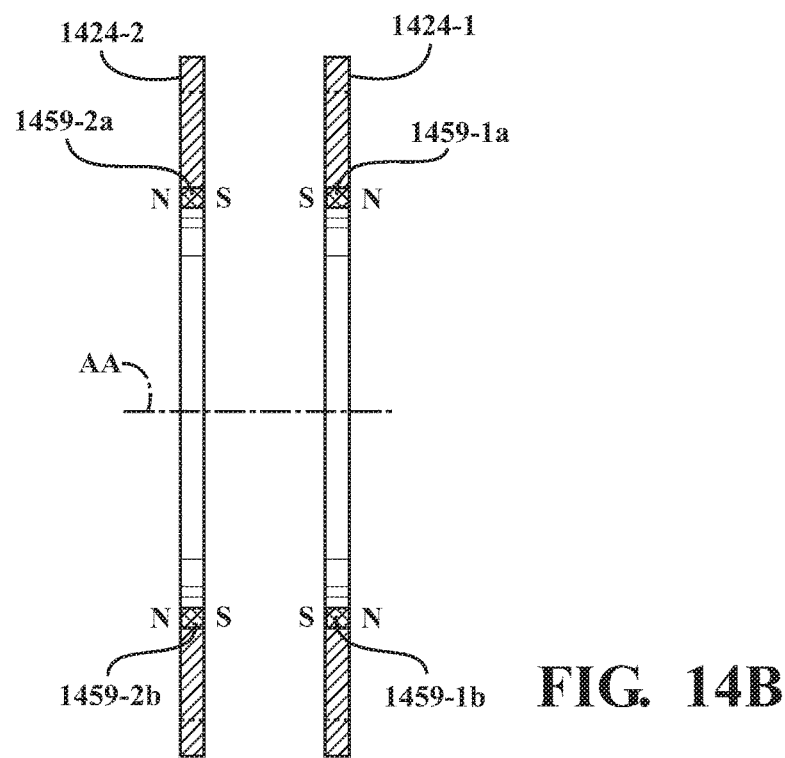
FIG. 14B is a schematic cross-sectional side view showing a pair of adjacent separator plates including associated magnets structured as shown in FIG. 14A.

Referring to FIGS. 14A-14B, in another embodiment, a separator plate 1424-1 may have an annular portion 1424-1$n$. The annular portion 1424-1$n$ may have with a central opening 1424-1$u$ defining an edge 1424-1$z$ of the central opening. In addition, the separator plate 1424-1 may have at least one magnet 1459-1$a$ positioned so as to extend along at least a portion of the edge 1424-1$z$ of the central opening 1424-1$u$. In the embodiment shown in FIGS. 14A-14B, the separator plate 1424-1 includes a first magnet 1459-1$a$ extending along a first portion of the edge 1424-1$z$ and in a direction from the edge 1424-1$z$ toward a central axis 1424$c$ of the separator plate, and a second magnet 1459-1$b$ extending along a second portion of the edge 1424-1$z$ and in a direction from the edge 1424-1$z$ toward the central axis 1424$c$ of the separator plate. First and second magnets may be attached to the separator plate 1424-1 using any suitable method, for example, adhesive attachment. When the separator plate is installed in a clutch assembly, the central axis 1424$c$ is coaxial with axis AA of the clutch assembly.

FIG. 14B shows another separator plate 1424-2 positioned adjacent separator plate 1424-1 and structured as shown in FIG. 14A to include magnets 1459-2$a$ and 1459-2$b$, except that the polarities of the magnets positioned along the edges of the central opening formed in separator plate 1424-2 are arranged so as to interact with the magnets in separator plate 1524-1 to generate a repulsive force, as previously described.

Figure 15A:
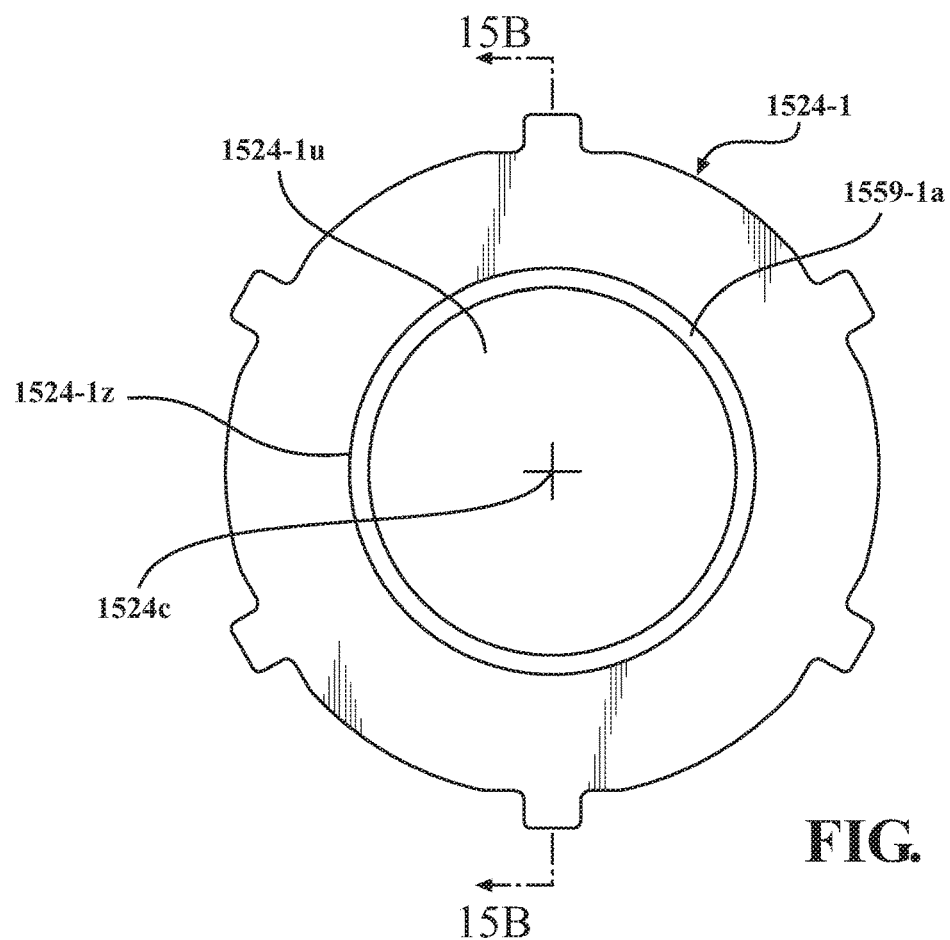
FIG. 15A is a schematic end view of a separator plate incorporating a magnet arrangement in accordance with another embodiment described herein.
Figure 15B:
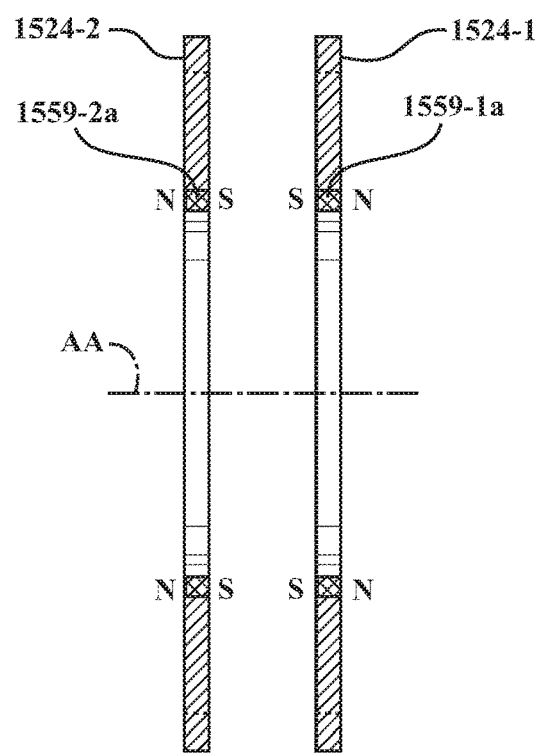
FIG. 15B is a schematic cross-sectional side view showing a pair of adjacent separator plates including associated magnets structured as shown in FIG. 15A.

In the embodiment shown in FIGS. 15A-15B, the separator plate 1524-1 includes a magnet 1559-1a in the form of a continuous ring extending along an entire edge 1524-1z of the central opening 1524-1u, and from the edge 1524-1z in a direction toward a central axis 1524c of the separator plate 1524-1. When the separator plate is installed in a clutch assembly, the central axis 1524c is coaxial with axis AA of the clutch assembly.

FIG. 15B shows an other separator plate 1524-2 positioned adjacent separator plate 1524-1 and structured as shown in FIG. 15A to include a magnet 1559-2a similar to magnet 1559-1a, except that the polarity of the magnet 1559-2a positioned along the edges of the central opening formed in separator plate 1524-2 is arranged so as to interact with the magnet 1559-1a in separator plate 1524-1 to generate a repulsive force, as previously described.

Figure 16A:
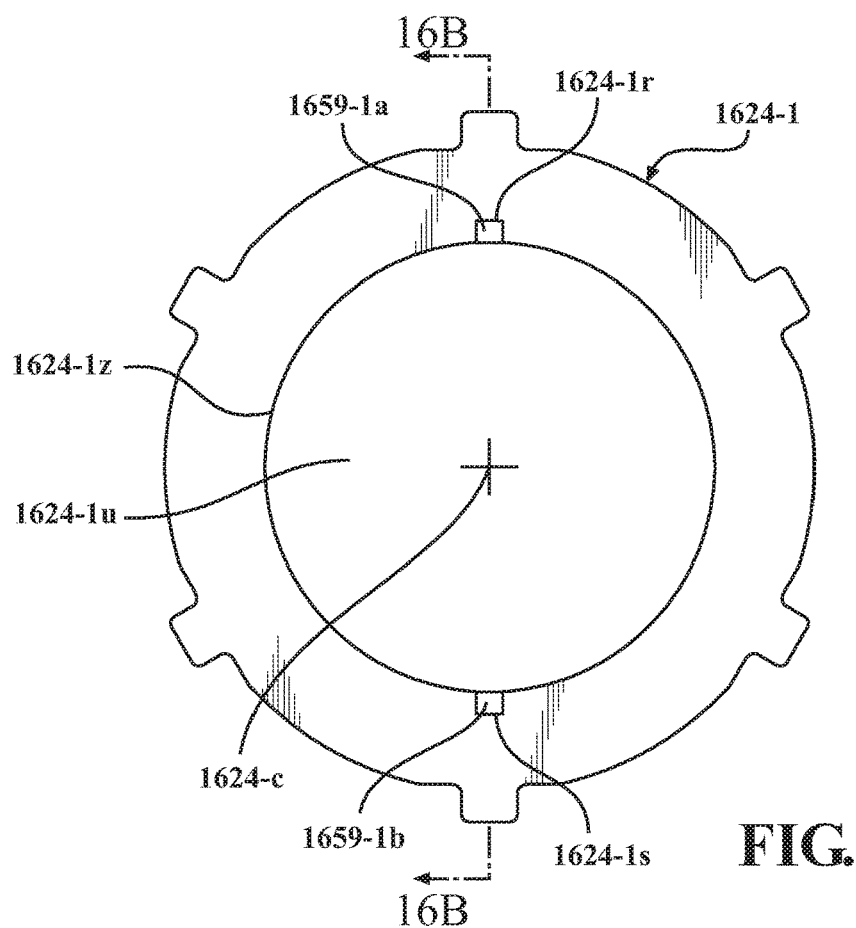
FIG. 16A is a schematic end view of a separator plate incorporating a magnet arrangement in accordance with another embodiment described herein.
Figure 16B:
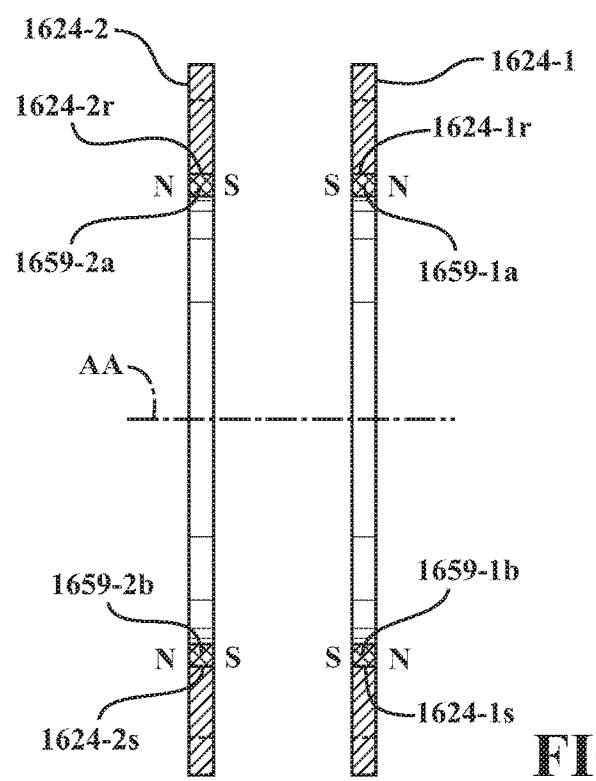
FIG. 16B is a schematic cross-sectional side view showing a pair of adjacent separator plates including associated magnets structured as shown in FIG. 16A.

In the embodiment shown in FIGS. 16A-16B, the edge 1624-1z of the central opening 1624-1u of separator plate 1624-1 includes a first recess 1624-1r formed therealong. The first recess 1624-1r may extend in a direction away from the separator plate central axis 1624c. The edge 1624-1z of the central opening 1624-1u of separator plate 1624-1 also includes a second recess 1624-1s diametrically opposite the first recess 1624-1r. The second recess 1624-1s may extend in a direction away from the separator plate central axis 1624c. In addition, a first magnet 1659-1a is positioned within the first recess 1624-1r, and extends in a direction from the edge toward the central axis 1624c of the separator plate. A second magnet 1659-1b is positioned within the second recess 1624-1s, and extends in a direction from the edge toward the central axis 1624c of the separator plate. First and second magnets 1659-1a and 1659-1b may be attached to the separator plate 1624-1 using any suitable method, for example, adhesive attachment or an interference fit. When the separator plate is installed in a clutch assembly, the central axis 1624c is coaxial with axis AA of the clutch assembly.

FIG. 16B shows an other separator plate 1624-2 positioned adjacent separator plate 1624-1 and structured as shown in FIG. 16A to include magnets 1659-2a and 1659-2b, except that the polarity of the magnets positioned along the edges of the central opening formed in separator plate 1624-2 are arranged so as to interact with the magnets in separator plate 1624-1 to generate repulsive forces, as previously described.

In magnets as shown in FIGS. 14A-16B positioned proximate center openings of the separator plates, the forces of attraction on a friction plate positioned between the adjacent separator plates will be equal. Thus, when the adjacent separator plates are spaced apart, the friction plate positioned between the separator plates will also be spaced apart from the adjacent separator plates.

Numerous other distributions of magnets in an individual separator plate and in a pair of adjacent separator plates are also possible.

In addition to the clutch assembly and separator plate embodiments described herein, a method is provided for generating a separation force between adjacent separator plates of a clutch assembly. The method may include the steps of providing a first separator plate including at least a first magnet, and providing a second separator plate positioned adjacent the first separator plate and including at least a second magnet. The at least a first magnet may be arranged such that a first pole of the at least a first magnet faces in a direction toward the second separator plate. The at least a second magnet may be arranged such that a first pole of the at least a second magnet having a polarity the same as the first pole of the at least a first magnet faces in a direction toward the first separator plate, and such that a separation force is generated between like poles of the at least a first magnet and the at least a second magnet.

In the method described above, each of the first separator plate and the second separator plate may have a plurality of angularly spaced-apart tabs extending from an outer edge thereof. In addition, the step of providing a first separator plate including at least a first magnet may include the step of attaching the at least a first magnet to a tab of the first separator plate. Also, the step of providing a second separator plate positioned adjacent the first separator plate and including at least a second magnet may include the step of attaching the at least a second magnet to a tab of the second separator plate.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A clutch assembly comprising at least a first separator plate and a second separator plate coaxial with and adjacent the first separator plate, wherein the first separator plate includes at least a first magnet arranged such that a first pole of the at least a first magnet faces in a direction toward the second separator plate, and the second separator plate includes at least a second magnet arranged such that a first pole of the at least a second magnet having a polarity the same as the first pole of the at least a first magnet faces in a direction toward the first separator plate, such that a repulsive force tending to force the first and second separator plates away from each other is generated between like poles of the at least a first magnet and the at least a second magnet, and wherein the at least a first magnet is positioned along a first axis extending parallel to a rotational axis of the clutch assembly and the at least a second magnet is positioned along a second axis extending parallel to the rotational axis of the clutch assembly, and wherein the second axis is spaced apart from the first axis.

2. The clutch assembly of claim 1 wherein each of the first separator plate and the second separator plate has an annular portion and a plurality of angularly spaced-apart tabs extending from an outer edge of the annular portion, wherein the first separator plate has a first tab and the second separator plate has a second tab aligned with and adjacent the first tab, wherein the at least a first magnet is arranged in the first tab such that the first pole of the at least a first magnet faces in a direction toward the second tab, and the at least a second magnet is arranged in the second tab such that the first pole of the at least a second magnet having a polarity the same as the first pole of the at least a first magnet faces in a direction toward the first tab, such that a repulsive force tending to force the first and second tabs away from each other is generated between like poles of the at least a first magnet and the at least a second magnet.

3. The clutch assembly of claim 1 wherein the second axis is located with respect to the first axis such that the repulsive force generated between like poles of the first and second magnets tends to produce a rotation of the second separator plate in a first direction relative to the first separator plate, wherein the first separator plate further includes a third magnet arranged such that a first pole of the third magnet faces in a direction toward the second separator plate, the second separator plate further including a fourth magnet arranged such that a first pole of the fourth magnet having a polarity the same as the first pole of the third magnet faces in a direction toward the first separator plate, such that a repulsive force tending to force the first and second separator plates away from each other is generated between like poles of the third magnet and the fourth magnet, wherein the third magnet is positioned along a third axis extending parallel to the rotational axis of the clutch assembly, and the fourth magnet is positioned along a fourth axis extending parallel to a rotational axis of the clutch assembly, wherein the fourth axis is spaced apart from the third axis, and wherein the fourth axis is located with respect to the third axis such that the repulsive force generated between like poles of the third and fourth magnets tends to produce a rotation of the second separator plate in a second direction relative to the first separator plate, the second direction being opposite the first direction.

4. The clutch assembly of claim 1 wherein each of the first separator plate and the second separator plate further comprises an annular portion structured for contacting an adjacent friction plate, and a plurality of angularly spaced-apart tabs extending from an outer edge of the annular portion, wherein a magnet of the at least a first magnet is arranged on each tab of at least a portion of the tabs of the plurality of tabs of the first separator plate, and a magnet of the at least a second magnet is arranged on each tab of at least a portion of the tabs of the plurality of tabs of the second separator plate.

5. The clutch separator plate of claim 4 wherein the plurality of tabs comprises a first tab and a second tab positioned diametrically opposite the first tab, and wherein a magnet of the at least a first magnet and the at least a second magnet is arranged on each of the first and second tabs.

6. A clutch assembly comprising at least a first separator plate and a second separator plate coaxial with and adjacent the first separator plate, wherein the first separator plate includes at least a first magnet arranged such that a first pole of the at least a first magnet faces in a direction toward the second separator plate, and the second separator plate includes at least a second magnet arranged such that a first pole of the at least a second magnet having a polarity the same as the first pole of the at least a first magnet faces in a direction toward the first separator plate, such that a repulsive force tending to force the first and second separator plates away from each other is generated between like poles of the at least a first magnet and the at least a second magnet, and wherein the at least a first magnet has an energy density different from an energy density of the at least a second magnet.

7. A clutch assembly comprising at least a first separator plate and a second separator plate coaxial with and adjacent the first separator plate, wherein the first separator plate includes at least a first magnet arranged such that a first pole of the first magnet faces in a direction toward the second separator plate, and the second separator plate includes at least a second magnet arranged such that a first pole of the second magnet having a polarity the same as the first pole of the first magnet faces in a direction toward the first separator plate, such that a repulsive force tending to force the first and second separator plates away from each other is generated between like poles of the first magnet and the second magnet, the clutch assembly further comprising a backing plate, wherein the first separator plate is adjacent the backing plate, wherein the at least a first magnet has a second pole opposite the first pole of the at least a first magnet, wherein a backing plate magnet is arranged in the backing plate adjacent the first separator plate such that a pole of the backing plate magnet having a polarity the same as the second pole of the at least a first magnet faces in a direction toward the first separator plate, such that a repulsive force tending to force the first separator plate away from the backing plate is generated between like poles of the at least a first magnet and the backing plate magnet.

8. A method of generating a separation force between adjacent separator plates of a clutch, the adjacent separator plates being arranged so as to have a common rotational axis, the method comprising the steps of:

providing a first separator plate including at least a first magnet; and providing a second separator plate positioned adjacent the first separator plate and including at least a second magnet, the at least a first magnet being arranged such that a first pole of the at least a first magnet faces in a direction toward the second separator plate, the at least a second magnet being arranged such that a first pole of the at least a second magnet having a polarity the same as the first pole of the at least a first magnet faces in a direction toward the first separator plate, and such that a separation force is generated between like poles of the at least a first magnet and the at least a second magnet, the at least a first magnet being positioned along a first axis extending parallel to the rotational axis of the adjacent separator plates and the at least a second magnet being positioned along a second axis extending parallel to the rotational axis of the adjacent separator plates, and wherein the second axis is spaced apart from the first axis.

* * * * *